United States Patent
He (10) Patent No.: US 9,986,462 B2
(45) Date of Patent: May 29, 2018

(54) DOUBLE-CONNECTION IMPLEMENTATION METHOD AND BASE STATION

(71) Applicant: ZTE CORPORATION, Shenzhen, Guangdong Province (CN)

(72) Inventor: Feng He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days. days.

(21) Appl. No.: 14/776,704

(22) PCT Filed: Mar. 18, 2014

(86) PCT No.: PCT/CN2014/073635
§ 371 (c)(1),
(2) Date: Sep. 14, 2015

(87) PCT Pub. No.: WO2014/169748
PCT Pub. Date: Oct. 23, 2014

(65) Prior Publication Data
US 2016/0044540 A1 Feb. 11, 2016

(30) Foreign Application Priority Data
Apr. 15, 2013 (CN) .......................... 2013 1 0130364

(51) Int. Cl.
*H04W 36/28* (2009.01)
*H04W 28/08* (2009.01)
(Continued)

(52) U.S. Cl.
CPC ......... *H04W 28/085* (2013.01); *H04W 76/00* (2013.01); *H04W 76/025* (2013.01)

(58) Field of Classification Search
None
See application file for complete search history.

(56) References Cited

U.S. PATENT DOCUMENTS 9,072,020 B2 * 6/2015 Li ........................... H04W 36/20
2011/0294508 A1 * 12/2011 Min ................... H04W 36/0083
455/436
(Continued)

FOREIGN PATENT DOCUMENTS

CN 1235744 A 11/1999
CN 102265671 A 11/2011

OTHER PUBLICATIONS

R2-130228; Analysis of inter-node signaling load for mobility mechanism in small cell deployment; Huawei, HiSilicon; 3GPP TSG-RAN WG2 Meeting#81; St.Julian's, Malta, Jan. 28-Feb. 1, 2013.
(Continued)

*Primary Examiner* — Kibrom T Hailu
(74) *Attorney, Agent, or Firm* — Ling Wu; Stephen Yang; Ling and Yang Intellectual Property (57) ABSTRACT

A method for implementing dual connectivity includes: a first base station which a user equipment accesses completing related management of a connection of the user equipment in a second base station through a dual connectivity management interface between the present base station and second base station, thereby realizing dual connectivity of the user equipment to the first base station and the second base station. The base station includes a management module, configured to: when the present base station serves as the first base station which the user equipment accesses, complete the related management of the connection of the user equipment in the second base station through the dual connectivity management interface; an acceptance module, configured to: when serving as the second base station, accept related management of the first base station for the connection of the user equipment in the present base station through the dual connectivity management interface.

15 Claims, 5 Drawing Sheets

(51) Int. Cl.
*H04W 76/00* (2018.01)
*H04W 76/02* (2009.01)

(56) References Cited

U.S. PATENT DOCUMENTS

| | | | | |
|---|---|---|---|---|
| 2013/0109396 A1* | 5/2013 | Drazynski | ......... | H04W 36/0033 455/444 |
| 2013/0165130 A1* | 6/2013 | Wu | ....... | H04W 36/08 455/444 |
| 2014/0092823 A1* | 4/2014 | Song | ......... | H04L 1/00 370/329 |
| 2015/0009923 A1* | 1/2015 | Lei | ......... | H04W 72/0413 370/329 |
| 2015/0031369 A1* | 1/2015 | Gunnarsson | ......... | H04W 36/04 455/438 |
| 2015/0131535 A1* | 5/2015 | Wallentin | ......... | H04W 76/025 370/329 |
| 2015/0230236 A1* | 8/2015 | Zeng | ......... | H04L 41/0806 370/329 |
| 2015/0282239 A1* | 10/2015 | Han | ......... | H04W 76/025 370/329 |
| 2015/0382260 A1* | 12/2015 | Van Phan | ......... | H04W 36/04 455/436 |
| 2016/0050707 A1* | 2/2016 | Li | ......... | H04L 5/001 370/331 |
| 2016/0066241 A1* | 3/2016 | Wu | ......... | H04W 36/28 370/331 |

OTHER PUBLICATIONS

R2-130950; Discussion on challenge and possible solution on small cell; ZTE Corporation; 3GPP TSG-RAN2 Meeting #bis Chicago, USA, Apr. 15-Apr. 19, 2013.
R2-130978; RRM related issues of Dual Connectivity technique; CATT; 3GPP TSG-RAN2 Meeting #81bis Chicago, USA, Apr. 15-Apr. 19, 2013.
R2-130980; UE Context Transfer and the CN Signalling for Different Traffic Types; CATT; 3GPP TSG-WG2 Meeting #81bis Chicago, USA, Apr. 15-Apr. 19, 2013.
R2-131219; CP Radio Protocol for Dual Connectivity; LG Electronics Inc. 3GPP TSG-WG2 #81bis Chicago, USA, Apr. 15-Apr. 19, 2013.
R2-131260; Analysis of inter-node signalling load for mobility mechanism in small cell deployment; Huawei, HiSilicon; 3GPP TSG-WG2 Meeting #81bis Chicago, USA, Apr. 15-Apr. 19, 2013.
Tdoc R2-130420; Protocol architecture alternatives for dual connectivity; Ericsson, ST-Ericsson; 3GPP TSG-WG2 #81; Malta,Jan. 28-Feb. 1, 2013.
Necessity of C-plane architecture enhancements for dual connectivity; NTT Docomo, Inc.; 3GPP TSG-RAN2# 81; Jan. 28-Feb. 1, 2013; St. Julian's, Malta; R2-130488.
Discussion on U-plane architecture for dual connectivity; NTT Docomo, Inc.;3GPP TSG-RAN WG2 #81; St. Julian's, Malta, Jan. 28-Feb. 1, 2013; R2-130324, pp. 1-4.

* cited by examiner

DOUBLE-CONNECTION IMPLEMENTATION METHOD AND BASE STATION

TECHNICAL FIELD

The present document relates to a method for implementing data transmission in dual connectivity in a mobile communication system, and more particularly, to a method for implementing dual connectivity and a base station.

BACKGROUND OF THE RELATED ART

With constant evolution of radio communication technologies and standards, mobile packet services have been developed tremendously, and data throughput capability of a single terminal is constantly upgrading. Take the Long Term Evolution (referred to as LTE) system for example, a maximum downlink data transmission rate of 100 Mbps is supported in 20 M bandwidth, and in the subsequent LTE Advanced network, the transmission rate of data will be further increased, even up to 1 Gbps.

Figure 1:
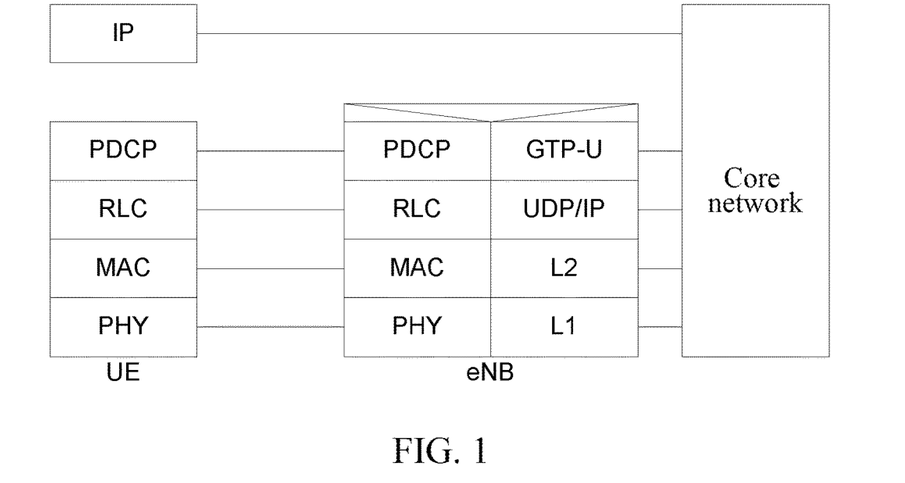
FIG. 1 is a schematic diagram of a LTE user plane protocol stack in the related art.

The user plane data protocol stack of LTE is shown in FIG. 1, the downlink data received by an evolved NodeB (Evolved eNB) from the core network via the GPRS Tunneling Protocol for the user plane (referred to as GTP-U) is unpackaged and sent to the User Equipment (abbreviated to UE) after processed by the packet data convergence protocol (referred to as PDCP) sub-layer, the Radio Link Control (referred to as RLC) protocol sub-layer, the media access control (MAC) protocol sub-layer and the physical (PHY) layer; the uplink data transmission is exactly opposite to the downlink one. The user plane GTP-U data of different services in the connection between the Evolved eNB and the core network are born by the E-UTRAN Radio Access Bearer (referred to as ERAB). The user plane connection between the Evolved eNB and the UE is born by a number of data radio bearers (DRBs).

Currently, the data transmission connection between the network side and the UE is a one-to-one dedicated connection, therefore the signal quality and the size of the used resource of this connection link determines the data transmission performance between the network side and the UE. If the resource used by the link is restricted or the signal quality is relatively poor, the UE's user experience will decrease, which is a great challenge now faced by mobile operators, and although the network capacity extends year by year, it still cannot keep up with the increasing number of user terminals and the increasing user demand on data traffic.

In order to meet the growing demand on data traffic as well as the geographically uneven characteristics of the services, the operators add Low Power Nodes (abbreviated to LPNs), Small Cells or Pico eNBs to increase hotspots in the process of deploying the new generation of communication network (such as the LTE). With the increasing LPN cells, the network deployment environment becomes more complex, meanwhile it also brings some problems. First, because the coverage of a LPN cell is much smaller compared with that of a Macro Cell, the capacity is relatively small, and some LPN cells could easily be fully occupied by users, leading to the load too high, the throughput of the user data is affected, and some other LPN cells or macro cells are at a relatively low level of load. In order to balance the load, the network side needs to perform load balancing operation, but this process is not flexible enough, especially when the number of cells is relatively large, this phenomenon of uneven load becomes more serious because of a lack of flexibility; in addition, because the number of LPN cells is relatively large, when the user equipment, also called terminal, moves within the network, it will lead to frequent inter-cell handovers, causing frequent data service interruption or even call dropped, which causes user data throughput and user experience to decrease. At the same time, this frequent handover results in the terminal and the network, especially the core network, receiving the impacts of a large number of signaling, which may lead to a congestion and even paralysis of system resources.

With the increase of the number of LPN cells deployed by operators and individuals in the future, the abovementioned situation becomes increasingly serious, therefore nowadays many companies and operators are inclined to looking for new enhancing schemes, and Dual Connectivity is one of them. Terminals in the dual connectivity can simultaneously remain connected with at least two network nodes, and for example, the UE remains connected with the macro cell and the LPN cell at the same time. When the network load is not balanced, the network side can adjust the amount of data transmitted by the terminal on both nodes in real time. At the same time, if the UE moves or the LPN cell changes due to other reasons, the other cell can still stay connected, and this change will not lead to the impact of excessive signaling.

However, the abovementioned dual connectivity method currently is only at the demand and demonstration stage, and the abovementioned enhancing scheme is unable to be achieved in the current network structure and process.

SUMMARY OF THE INVENTION

The purpose of the present document is to provide a method for implementing dual connectivity and a base station to overcome the defect that the dual connectivity enhancing scheme cannot be implemented in the existing network architecture and process.

To solve the abovementioned problem, the present document provides a method for implementing dual connectivity, comprising:

a first base station which a user equipment access completing related management of a connection of the user equipment in a second base station through a dual connectivity management interface between the first base station and the second base station, to achieve a dual connectivity of the user equipment to the first base station and the second base station.

Preferably, connections of the user equipment in the first and second base stations respectively bear at least one radio bearer (RB) data and/or E-UTRAN radio access bearer (ERAB) data.

Preferably, the RB data comprises control plane data and/or user plane data;

wherein the control plane data are signaling radio bearer data, and the user plane data are data radio bearer data.

Preferably, said completing the related management of the connection of the user equipment in the second base station comprises: adding, modifying or deleting a connection bearer of the user equipment in the second base station.

Preferably, said completing the related management of the connection of the user equipment in the second base station comprises: establishing, modifying or deleting context of the user equipment in the second base station.

Preferably, said completing the related management of the connection of the user equipment in the second base station comprises: routing data received and transmitted by the user equipment through the second base station.

Preferably, said routing the data received and transmitted by the user equipment through the second base station comprises: for the received downlink data, the first base station sending data corresponding to part or all of radio bearers received from a core network to the second base station through the dual connectivity management interface between the first base station and the second base station, and eventually sending the data to the user equipment;

for the uplink data sent by the user equipment via the second base station, the second base station sending the uplink data to the first base station via the dual connectivity management interface, and then the first base station routing the uplink data to the core network.

Preferably, the management of the first base station for the connection bearer and context of the user equipment in the second base station is implemented through a control plane signaling process of the dual connectivity management interface between the first base station and the second base station.

Accordingly, the present document further provides a base station, comprising:

a management module, which is configured to: when the present base station serves as a first base station which a user equipment accesses, complete related management of a connection of the user equipment in a second base station through a dual connectivity management interface between the present base station and the second base station, to achieve a dual connectivity of the user equipment to the first base station and the second base station;

an acceptance module, which is configured to: when serving as the second base station, through the dual connectivity management interface between the present base station and the first base station, accept related management of the first base station for a connection of the user equipment in the present base station.

Preferably, the management module is configured to: complete the related management of the connection of the user equipment in the second base station, comprising: the management module adding, modifying, or deleting a connection bearer of the user equipment in the second base station.

Preferably, the management module is configured to: complete the related management of the connection of the user equipment in the second base station, comprising: the management module establishing, modifying or deleting context of the user equipment in the second base station.

Preferably, the management module is configured to: complete the related management of the connection of the user equipment in the second base station, comprising: the management module routing data transmitted and received by the user equipment through the second base station.

Preferably, the management module is configured to: route the data transmitted and received by the user equipment through the second base station, comprising: for the received downlink data, the management module sending data corresponding to some or all of radio bearers received from a core network to the second base station through the dual connectivity management interface between the present base station and the second base station, and eventually sending the data to the user equipment; and for uplink data sent by the user equipment to the present base station through a dual connectivity management interface in the second base station, routing the uplink data to the core network.

With the embodiment of the present invention, the connection between the network side and the terminal is no longer restricted by the transmission performance of a single link, and data shunting and distributing method can be flexibly scheduled according to the network environment or resource condition between the network side and the UE. When frequent inter-small cell handover occurs in the UE, the user data can be shunted to another connection, so it is possible to ensure the continuity of data service, and enhance performance and user experience of the user data service. Meanwhile, the service handover of the service connection between multiple flows can be implemented by changing the user plane connection, thereby reducing the impact of the control plane signaling to the network. Furthermore, the embodiment of the present invention may also be sufficient to ensure backward compatibility of the network.

PREFERRED EMBODIMENTS OF THE INVENTION

Hereinafter, in conjunction with the accompanying drawings, the embodiments of the present invention will be described in detail. It should be noted that, in the case of no conflict, embodiments and features in the embodiments of the present application may be arbitrarily combined with each other.

Figure 2:
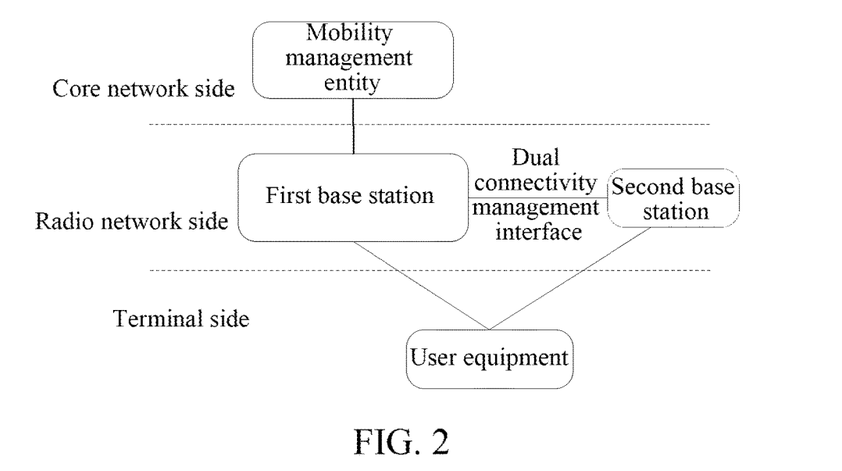
FIG. 2 is a schematic diagram of a dual connectivity network implementation method in accordance with an embodiment of the present invention.

In the present embodiment, a method for implementing dual connectivity, applied to the case that a terminal simultaneously access two or more wireless access network nodes, as shown in FIG. 2, comprises:

the first base station which the user equipment accesses completing related management of the connection of the user equipment in the second base station through a dual connectivity management interface between the first base station and the second base station, and achieving a dual connectivity of the user equipment to the first base station and the second base station. The related management of the first base station for the connection of the user equipment in the second base station comprises one or more of the following items:

1) management of the connection bearer of the user equipment in the second base station, which may comprise one or more of the following items:

A) adding a connection bearer of the user equipment in a second base station;

B) modifying the connection bearer of the user equipment in the second base station;

C) deleting the connection bearer of the user equipment in the second base station.

2) management of the context of the user equipment in the second base station, which comprises one or more of the following items:

A) establishing context of the user equipment

B) modifying the context of the user equipment

C) deleting the context of the user equipment 3) routing the data received and sent by the user equipment through the second base station.

The connection bearer of the user equipment in the second base station comprises radio bearer (referred to as RB) and/or E-UTRAN Radio Access Bearer (referred to as ERAB), and the RB comprises signaling radio bearer (referred to as SRB) data and/or data radio bearer (referred to as DRB).

The connections of the user equipment in the first and second base stations can respectively bear at least one radio bearer (referred to as RB) data and/or E-UTRAN Radio Access Bearer (referred to as ERAB) data.

Figure 3A:
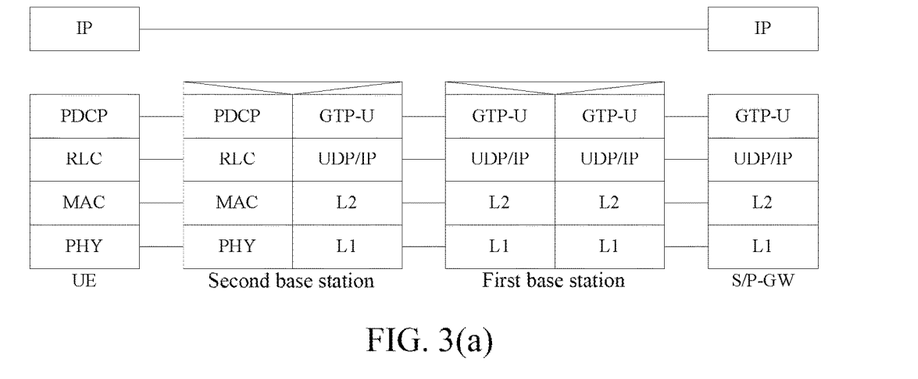
FIGS. 3(a)-(b) are schematic diagrams of user plane routing protocol stack of a second base station in a dual connectivity scene in accordance with an embodiment of the present invention.

Furthermore, the first base station routing the data received and transmitted by the user equipment through the second base station refers to: for the received downlink data, the first base station sending the data corresponding to part or all of the radio bearers received from the core network (specifically the S-GW (System GateWay)) to the second base station through the dual connectivity management interface between the first base station and the second base station, and eventually sending the data to the UE; correspondingly, for uplink data sent by the UE through the second base station, the second base station sending the data to the first base station through the dual connectivity management interface, and then the first base station routing the uplink data to the S-GW. The transmission of the uplink and downlink data in the dual connectivity management interface can adopt any existing protocol stack, such as the GTP-U tunneling protocol, to complete, as shown in FIG. 3a.

Figure 3B:
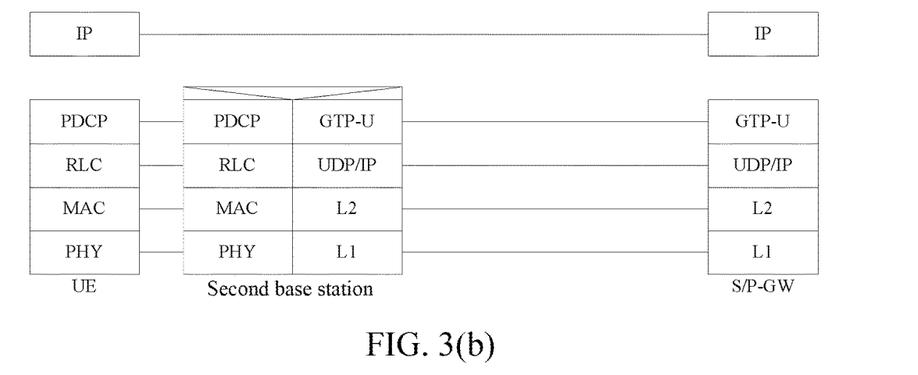

Furthermore, the data received and sent by the user equipment through the second base station can be directly sent to the core network without routing through the first base station, as shown in FIG. 3b. As to whether to use the routing function of the first base station for the second base station, it can be determined by the specific implementation.

Figure 4:
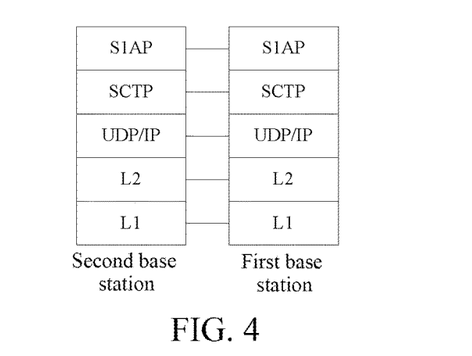
FIG. 4 is a schematic diagram of a protocol stack of interface between the first base station and the second base station in accordance with an embodiment of the present invention.

Furthermore, the management of the first base station for the connection bearer and context of the user equipment in the second base station can be implemented through the control plane signaling process of the dual connectivity management interface between the first base station and the second base station, as shown in FIG. 4, and the protocol stack of the connection interface can also adopt the existing S1 interface protocol or other protocol stacks.

Furthermore, the first and second base stations are the general designation for radio access network elements in the LTE system, and it can be a Macro base station (Macro), a Pico base station (Pico), a low power node (LPN), a small cell or a home evolved NodeB (HeNB). In a particular implementation, it can be determined according to the network deployment.

Furthermore, the core network control plane entity, such as the mobility management entity (referred to as MME), interacts with the first base station through the S1 interface protocol stack.

In the following, different application examples are used to describe the present document in further detail.

First Application Example

Figure 5:
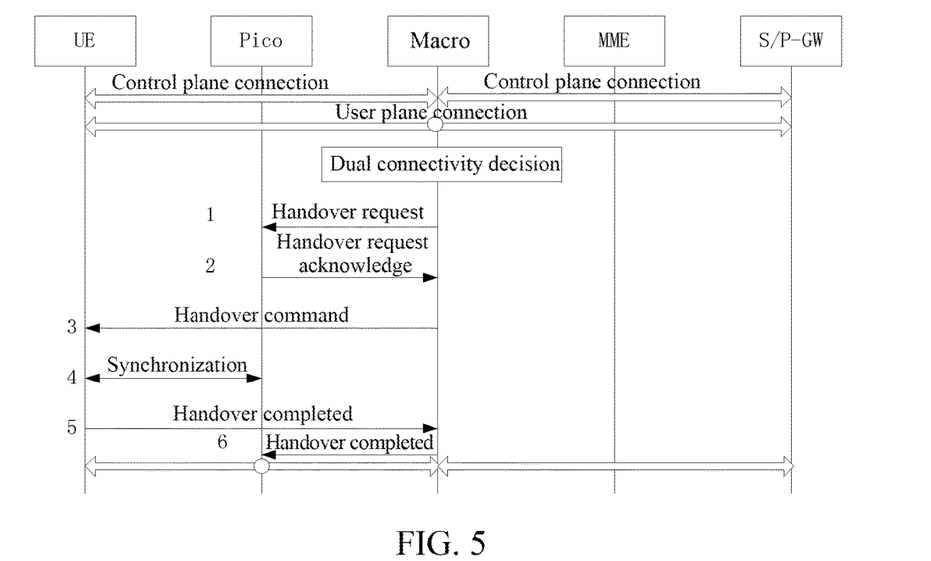
FIG. 5 is a process schematic diagram of a first application example in accordance with the present invention.

As shown in FIG. 5, there are Macro and Pico in the deployed network, wherein the UE has the service connection bearer in the first base station, that is the Macro, wherein the network-side Access Stratum and Non-Access Stratum control planes are respectively ended in the Macro and the MME, and the Macro-side user plane is ended in the core network gateway (S/P-GW). The present embodiment is described by taking the method of adding a connection of the UE in the second base station (that is, the Pico base station) as well as establishing the UE context for example, comprising the following steps:

in step 1, the Macro sends a handover request to the Pico, and the request carries information of the connection bearer which needs to be established in the Pico. Because the UE did not have a connection in the Pico previously, the context information of UE also needs to be carried in the handover request. In the step, the existing S1 interface signaling can be multiplexed for implementation, such as the Handover request, and other existing signaling or newly added signaling can be used for implementation.

Furthermore, the condition for triggering the Macro to initiate the abovementioned process can be realized by an internal algorithm in the Macro or may be triggered by the core network or the UE side, for example, the MME initiates a new bearer establishment actively.

Furthermore, the information of connection bearer carried in the abovementioned handover request at least comprises: identification information of ERAB, bearer addresses of ERAB and port identification and so on. The bearer address is the uplink data transmission address, and it can be set as the Macro's address or the address of the core network gateway S/P-GW, which depends on the specific implementation.

Furthermore, the UE context information carried in the abovementioned handover request comprises at least the identification information of UE, the UE capability information and the security context information and so on.

In step 2, the Pico performs acceptance, resource allocation and other internal processing according to the handover request, and saves and establishes the context information of UE in the Pico in accordance with the handover request, and after it succeeds, it sends a handover acknowledge to the Macro, and the handover acknowledge carries the identification and resources allocated by the Pico to the UE and user plane connection bearer information. In the step, the Handover Request Acknowledge message of the existing S1 interface can be multiplexed, or other existing signaling or newly added signaling can be used for implementation.

The user plane connection bearer information comprises DRB (Data Radio Bearer) information in the air interface bearer information, as well as the ground ERAB connection information.

In step 3, the Macro sends the related information in the handover request acknowledge replied by the Pico to the UE, to indicate the UE to establish a connection bearer in the Pico. The abovementioned related information can be carried through the existing RRC connection reconfiguration message, or carried through other newly added messages. In order to distinguish it from normal single-connection signaling, a special flag or a specified field can be added in the message.

In step 4, the UE and the Pico are synchronized, wherein this step is optional for execution according to the actual situation.

In step 5, the UE completes the context establishment according the Macro's command message, and sends a reply message to the Macro after being synchronized with the Pico.

Because the Pico does not allocate the control plane bearer information in the step 2, the UE and the Pico only establish a user plane DRB but not a control plane connection. Therefore in this step, the UE only can send a reply message to the Macro.

If the Pico allocates the control plane SRB information to the UE in the step 2, then in this step, the UE can directly send a reply message in the control plane connection between the UE and the Pico.

In step 6, the Macro forwards the UE's reply message to the Pico, to notify the Pico that the bearer establishment is completed.

Through the abovementioned steps, the establishment of the connection bearer of the UE in the Pico base station is completed. The data in the corresponding bearers can be transmitted and received from the Pico, while other part of bearers remain in the Macro, thus enabling data to be shunted at the Macro side, or achieving data transmission in the dual connectivity. In the abovementioned steps, the Macro can manage the connection bearer in real time according to the network's actual situation (such as the network load) or other algorithms. And seen from the core network, the connectivity and management of Macro is only concerned, so that the scheme not only solves the management of dual connectivity of UE, but also ensures the backward compatibility with the core network.

Second Application Example

Figure 6:
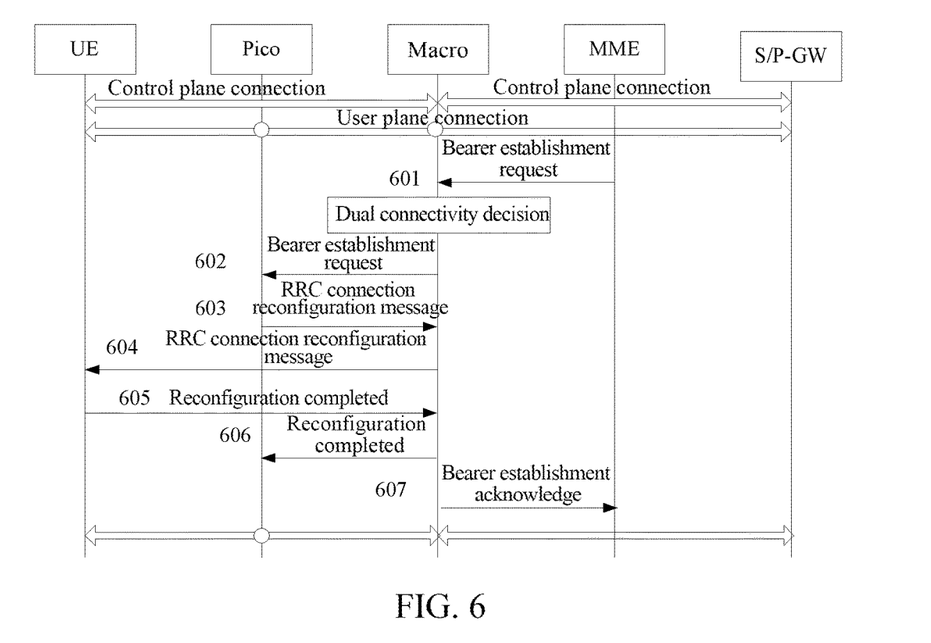
FIG. 6 is a process schematic diagram of a second application example in accordance with the present invention.

As shown in FIG. 6, there are Macro and Pico in the deployed network, and the UE has dual connectivity in the Macro and the Pico, wherein the UE only has the user plane connection in the Pico, wherein the network-side Access Stratum and Non-Access Stratum control planes are respectively ended in the Macro and the MME, and the core network user plane node is the core network gateway. The present embodiment is described by taking the method of adding a connection of the UE in the second base station, that is, the Pico base station, for example, comprising the following steps:

in step 601, the MME sends an ERAB establishment request message to the Macro, and the request message carries the ERAB information to be established.

In step 602, after receiving the message, the Macro decides to establish the newly established ERAB into the Pico according to the load information of the present base station as well as the Pico base station, or according to other established algorithms. Therefore the Macro forwards the abovementioned ERAB establishment request message to the Pico.

Because the UE has already had a connection, that is context, in the Pico, other context information of the UE may not be carried in this step, or the modification information of the UE context may be carried. The detailed execution depends on the implementation.

The ERAB information carried in the abovementioned ERAB establishment request message comprises at least the identification information of ERAB, the bearer addresses of ERAB and the port identification and so on. The bearer address is the address of the core network gateway S/P-GW.

If the Macro wants to be the routing node of Pico, then the address of ERAB is set as the address of Macro, and the Macro needs to perform conversion between the ERAB's address in the S/P-GW and its address in the Macro.

In step 603, the Pico performs acceptance, resource allocation and other internal processing according to the request message, and after it succeeds, the Pico sends the newly established bearer information to the Macro through a handover request acknowledge, wherein the handover request acknowledge carries the information configured by the Pico for the newly established bearer and the user plane connection bearer information.

In the step, Handover Request Acknowledge message of the existing S1 interfaces can be multiplexed, or other existing signaling or newly added signaling can be used for implementation.

The abovementioned user plane connection bearer information comprises DRB (Data Radio Bearer) information of the air interface bearer information, as well as address and port information of the ERAB allocated by the Pico at the Pico side.

In step 604, the Macro sends the related information in the handover request acknowledge replied by the Pico to the UE, to indicate the UE to establish a connection bearer in the Pico. The abovementioned related information could be carried through the existing RRC connection reconfiguration message, or carried by other newly added messages. In order to distinguish it from normal single-connection signaling, a special flag or a specified field can be added in the message.

In step 605, the UE completes the new bearer establishment according to the command message of Macro, and sends a reply message to the Macro.

Because the UE does not have the control plane bearer in the Pico, the UE can only send a reply message to the Macro. Because of the same reason in the step 603, the Pico can only interact with the UE through the Macro forwarding.

If the UE has the control plane connection in the Pico, the UE can directly send a reply message in the control plane connection between the UE and the Pico. At this point, the Pico in step 603 can also directly sends a message to the UE.

In step 606, the Macro forwards the UE's reply message to the Pico, to notify the Pico that the bearer establishment is completed.

In step 607, the Macro sends an ERAB establishment acknowledge message to the MME, wherein the address and port information of the ERAB at the access network side are the ERAB information allocated by the Pico in step 603.

Through the abovementioned steps, the establishment of the connection bearer of the UE in the Pico is completed.

In the abovementioned steps, the Macro manage the connection bearer of the UE in the Pico, and the Macro can manage the connection bearer in real time according to the network's actual situation (such as network load) or other algorithms. And seen from the core network, the connectivity and management of Macro is only concerned, so that the scheme not only solves the management of dual connectivity of UE, but also ensures the backward compatibility with the core network.

Furthermore, if the Macro decides to migrate the bearer in the Macro to the Pico according to its specific implementation algorithm, it can also send an ERAB establishment message to the Pico. The steps are similar to the those in the abovementioned process, however, this process is not triggered by the core network, therefore the Macro decides whether to inform the core network of the migrated bearer information or not according to the routing information of the user plane at the end of the process.

Third Application Example

Figure 7:
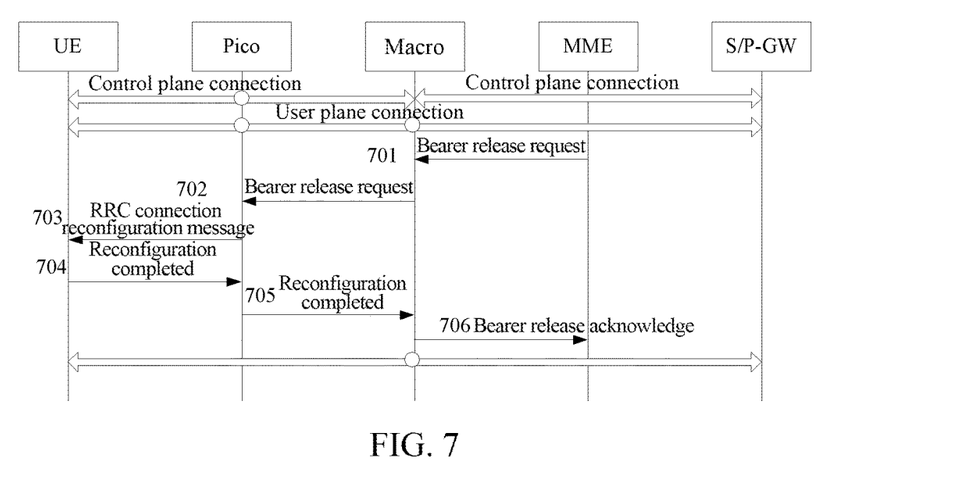
FIG. 7 is a process schematic diagram of a third application example in accordance with the present invention.

As shown in FIG. 7, there are Macro and Pico in the deployed network, and the UE has the dual connectivity in the Macro and the Pico, and it has the control plane and user plane connections in both nodes, wherein the network-side Access Stratum and Non-Access Stratum control planes are respectively ended in the Macro and the MME, and the core network user plane node is the core network gateway. The present embodiment is described by taking the method of releasing the connection of the UE in the second base station, that is, the Pico base station, for example, comprising the following steps:

in step 701, the MME sends an ERAB release command message to the Macro, wherein the message carries the ERAB information to be released.

in step 702, after receiving the abovementioned message, the Macro determines that the connection corresponding to the to-be-released ERAB exists in the Pico, thus the Macro forwards an ERAB release command message to the Pico, wherein the ERAB information carried therein comprises at least the identification information of ERAB.

In step 703, the Pico initiates a RRC connection reconfiguration to the UE according to the received ERAB release command message, wherein the message indicates the DRB information that needs to be released;

in step 704, after receiving the message, the UE releases the corresponding DRB in the Pico and replies a RRC connection reconfiguration completed message to the Pico.

Because the UE has a control plane in the Pico, the Pico can interact directly with the UE in steps 703 and 704. Otherwise, the abovementioned message can only be forwarded through the Macro.

In step 705, after receiving the reply from the UE and releasing the local resources, the Pico replies an ERAB release acknowledge message to the Macro.

In step 706, the Macro sends the ERAB release acknowledge message to the MME.

Through the abovementioned steps, the release of the UE's connection bearer in the Pico is completed.

Furthermore, if what the MME initiates is an ERAB modification process, it can be completed through a method similar to the abovementioned one, only the messaging process changes into an ERAB modification process. Therefore, no further explanation is made herein.

Fourth Application Example

Figure 8:
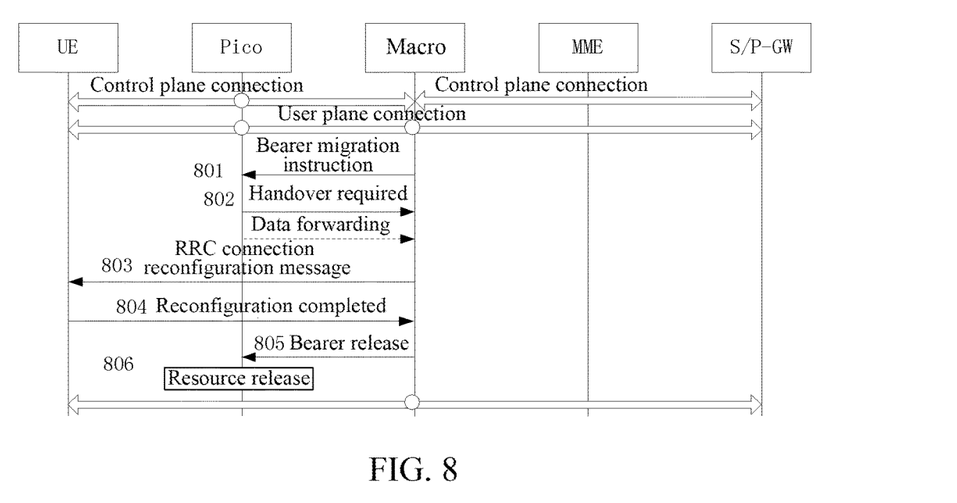
FIG. 8 is a process schematic diagram of a fourth application example in accordance with the present invention.

As shown in FIG. 8, there are Macro and Pico in the deployed network, and the UE has the dual connectivity in the Macro and the Pico, and it has control plane and user plane connections in both nodes, wherein the network-side Access Stratum and Non-Access Stratum control planes are respectively ended in the Macro and the MME, and the core network user plane node is the core network gateway. The present embodiment is described by taking the method of releasing all the connection bearers and context of the UE in the second base station, that is, the Pico, for example, comprising the following steps:

in step 801, the Macro determines to release the UE's connection bearer corresponding to the ERAB in the Pico according to the base station load or the UE measurement and other information or according to other internal algorithms, and migrates it to the Macro. Therefore the Macro sends a bearer migration instruction to the Pico, wherein it carries identification information of the target base station to which the connection bearer is migrated, that is the identification information of Macro.

Furthermore, if only part of bearer connections in the Pico are released, the message also needs to carry information of the connection bearers to be changed, including at least the identification information of ERAB; if all the bearers in the Pico need to be released, then the message can only carry one instruction information.

In step 802, the Pico initiates a handover required to the Macro according to the received bearer migration instruction, and the handover required carries information of the bearer to be migrated. Optionally, the Pico simultaneously initiates a data forwarding process to the Macro to send data cached in the Pico to the Macro.

The abovementioned process can be completed by multiplexing the S1 information Handover Required message.

In step 803, the Macro allocates resources to the migrated bearers according to the handover required received from the Pico, and sends a RRC connection reconfiguration message to the UE to indicate the UE to release the corresponding connection in the Pico and establish a corresponding connection bearer in the Macro.

In step 804, after completing the connection establishment, the UE replies a complete message to the Macro.

In step 805, after receiving the message, the Macro indicates the Pico to release the corresponding connection bearer.

in step 806, the Pico follows the instruction and releases the corresponding connection carrier and local resources.

Alternatively, if the user plane bearer data in the Pico is sent directly to the S/P-GW, as shown in FIG. 3b, the Macro eventually indicates the MME to update the local address and port of the involved ERAB to the address and port allocated by the Macro.

Through the abovementioned steps, the release of connection bearers of the UE in the Pico is completed, and corresponding connection bearers are established in the Macro to enable the Macro to flexibly control the UE's bearers in the dual connectivity.

Furthermore, the abovementioned process may be determined and initiated by the Pico actively, thereafter the process is the same as the above process of the Pico interacting with the macro, and it is not further explained herein.

Fifth Application Example

Figure 9:
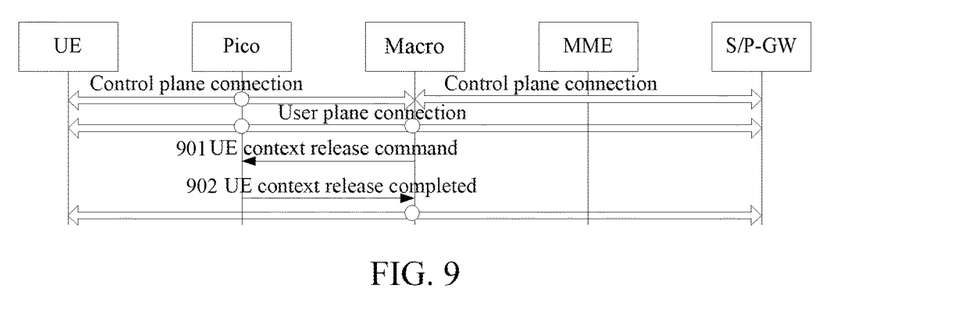
FIG. 9 is a process schematic diagram of a fifth application example in accordance with the present invention.

As shown in FIG. 9, there are Macro and Pico in the deployed network, and the UE has the dual connectivity in the Macro and the Pico, and it has control plane and user plane connections in both nodes, wherein the network-side Access Stratum and Non-Access Stratum control planes are respectively ended in the Macro and the MME, and the core network user plane node is the core network gateway. The present embodiment is described by taking the Macro managing the context of the UE in the second base station, that is, the Pico base station, for example, comprising the following steps:

in step 901, the Macro determines to modify the UE's context corresponding to the ERAB in the Pico according to the base station load or the UE measurement and other information, or according to other internal algorithms. Therefore the Macro sends a UE context modification message to the Pico, and the message carries any one or a combination of the following items: UE identification information, UE security context information, UE capability information, and other context information possible to be modified.

Furthermore, the step may also be initiated by the MME, for example, the MME initiates a UE context modification message to the Macro, and the Macro determines that the corresponding modification relates to the context information of the UE in the Pico, therefore the Macro initiates a context modification message to the Pico.

In step 902, the Pico saves the UE context modification message, and judges whether the modified context information will affect the air interface DRB or not, and if the DRB will be affected, a RRC connection reconfiguration process can be initiated directly to the UE through the Macro or the Pico (specifically depending on whether there is a control plane connection in the Pico or not, and if yes, the Pico can directly send a message, otherwise, the message needs to be forwarded by the Macro) to indicate the UE to modify the context. After making sure that the UE context information of the UE and in the Pico is modified completely, a UE context modification acknowledge is initiated to the Macro.

Through the abovementioned steps, the Macro completes the modification of the UE context in the Pico base station.

Furthermore, the Macro can also release the context of UE in the Pico through a process similar to the abovementioned one, and the difference lies in that the releasing process would be easier, after receiving the message, the Pico releases the UE's connection bearer and context resources in the Pico, and then replies to the Macro, which will not be repeated here.

Through the abovementioned embodiment, it can be seen that, through the method of the present document, the first base station can flexibly manage and control the second base station. Moreover it can maximally multiplex the existing messaging process, and it can minimize the modification of the core network and second base station, while it ensures the backward compatibility with standard protocols.

It should be noted that the abovementioned embodiments of the present invention only put forward feasible implementation schemes for some typical processes in the Macro and Pico deployment scenarios, and they are also applicable to other deployment scenarios, such as Macro and Macro, Pico and Pico, Macro and HeNB or LPN, HeNB and Pico, or any other combinations of scenarios, and in addition, the process of the present document is not limited, and there are other messaging processes, which can also be solved through the method of the present document.

Figure 10:
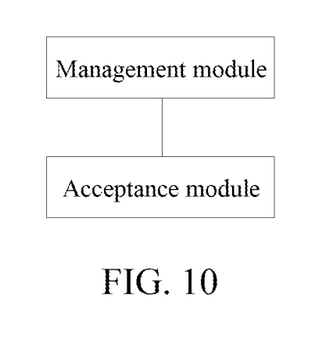
FIG. 10 is a schematic diagram of a base station in accordance with the present invention.

Furthermore, in the present embodiment, as shown in FIG. 10, a base station comprises: a management module, used to: when the present base station serves as a first base station which a user equipment accesses, complete related management of a connection of the user equipment in the second base station through a dual connectivity management interface between the present base station and the second base station, to achieve a dual connectivity of the user equipment to the first base station and the second base station;

an acceptance module, used to: when serving as the second base station, through the dual connectivity management interface between the present base station and the first base station, accept related management of the first base station for the connection of the user equipment in the present base station.

Furthermore, the management module is used to complete the related management for the connection of the user equipment in the second base station, specifically comprising:

the management module is used to add, modify, or delete the connection bearer of the user equipment in the second base station.

Furthermore, the management module is used to complete the related management for the connection of the user equipment in the second base station, specifically comprising:

the management module is used to establish, modify or delete the context of the user equipment in the second base station.

Furthermore, the management module is used to complete the related management for the connection of the user equipment in the second base station, specifically comprising:

the management module is used to route data transmitted and received by the user equipment through the second base station.

Furthermore, the management module is used to route the data transmitted and received by the user equipment through the second base station, specifically comprising:

for the received downlink data, the management module sending data corresponding to part or all of the radio bearers received from the core network to the second base station through the dual connectivity management interface between the present base station and the second base station, and eventually sending the data to the user equipment; and also for uplink data sent by the user equipment to the present base station through a dual connectivity management interface in the second base station, routing the uplink data to the core network.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present invention, and is not used to restrict the protection scope of the present document. According to the inventive content of the present document, there are many other embodiments, and without departing from the spirit and essence of the present document, those skilled in the art can make all corresponding changes and modifications in accordance with the present document, and any changes, equivalent replacements and improvements and so on made within the spirit and principles of the present document should be included within the protection scope of the present document.

INDUSTRIAL APPLICABILITY

With the embodiment of the present invention, the connection between the network side and the terminal is no longer restricted by the transmission performance of a single link, and data shunting and distributing method can be flexibly scheduled according to the network environment or resource condition between the network side and the UE. When frequent inter-small cell handover occurs in the UE, the user data can be shunted to another connection, so it is possible to ensure the continuity of data service, and enhance performance and user experience of the user data service. Meanwhile, the service handover of the service connection between multiple flows can be implemented by changing the user plane connection, thereby reducing the impact of the control plane signaling to the network. Furthermore, the embodiment of the present invention may also be sufficient to ensure backward compatibility of the network.

What is claimed is:

1. A method for implementing dual connectivity, comprising:
   a user equipment accessing a first base station;
   the first base station performing related management of a connection of the user equipment to a second base station through a dual connectivity management interface between the first base station and the second base station, to achieve a dual connectivity of the user equipment to the first base station and the second base station;
   wherein the first base station performing the related management of the connection of the user equipment to the second base station comprises:
   the first base station establishing or deleting context of the user equipment comprising UE identification information, UE security context information and UE capability information in the second base station;
   wherein when the first base station establishes the context of the user equipment in the second base station, the first base station sends a handover request carrying information of a connection bearer to be established in the second base station and context information of the user equipment to the second base station, and the second base station saves and establishes the context information of the user equipment in the second base station in accordance with the handover request;
   when the first base station deletes the context of the user equipment in the second base station, the first base station determines to release a connection bearer of the user equipment in the second base station and migrate the connection bearer of the user equipment to the first base station; the first base station sends to the second base station a bearer migration instruction carrying identification information of the first base station to which the connection bearer of the user equipment is migrated; the first base station sends a connection reconfiguration message to the user equipment to instruct the user equipment to release a corresponding connection in the second base station and establish a corresponding connection in the first base station; and the first base station instructs the second base station to release the connection bearer of the user equipment.

2. The method of claim 1, wherein
   connections of the user equipment to the first and second base stations respectively bear at least one radio bearer (RB) data and/or E-UTRAN radio access bearer (ERAB) data.

3. The method of claim 2, wherein
   the RB data comprises control plane data and/or user plane data;
   wherein the control plane data are signaling radio bearer data, and the user plane data are data radio bearer data.

4. The method of claim 1, wherein
   the first base station performing the related management of the connection of the user equipment to the second base station comprises:
   the first base station adding, modifying or deleting a connection bearer of the user equipment to the second base station.

5. The method of claim 1, wherein
   the first base station performing the related management of the connection of the user equipment to the second base station comprises:
   the first base station routing data received and transmitted by the user equipment through the second base station.

6. The method of claim 5, wherein
   said routing the data received and transmitted by the user equipment through the second base station comprises:
   for received downlink data, the first base station sending data corresponding to part or all of radio bearers received from a core network to the second base station through the dual connectivity management interface between the present base station and the second base station, and eventually sending the data to the user equipment;
   for uplink data sent by the user equipment through the second base station, the second base station sending the uplink data to the first base station through the dual connectivity management interface, and then the first base station routing the uplink data to the core network.

7. The method of claim 4, wherein
   a management of the first base station for connection bearer and context of the user equipment in the second base station is implemented through a control plane signaling process of the dual connectivity management interface between the first base station and the second base station.

8. A base station, comprising a management module when the base station serves as a first base station which a user equipment accesses, wherein,
   the management module is configured to perform related management of a connection of the user equipment to a second base station through a dual connectivity management interface between the first base station and the second base station, to achieve a dual connectivity of the user equipment to the first base station and the second base station;
   wherein the management module performs the related management of the connection of the user equipment to the second base station comprises: the management module in the first base station establishing or deleting context of the user equipment comprising UE identification information, UE security context information and UE capability information in the second base station;
   the base station comprising an acceptance module when the base station serves as the second base station, wherein,
   the acceptance module is configured to, through the dual connectivity management interface between the second base station and the first base station, accept related management of the first base station for a connection of the user equipment to the second base station;
   wherein when the first base station establishes the context of the user equipment in the second base station, the first base station sends a handover request carrying information of a connection bearer to be established in the second base station and context information of the user equipment to the second base station, and the second base station saves and establishes the context information of the user equipment in the second base station in accordance with the handover request;

when the first base station deletes the context of the user equipment in the second base station, the first base station determines to release a connection bearer of the user equipment in the second base station and migrate the connection bearer of the user equipment to the first base station; the first base station sends to the second base station a bearer migration instruction carrying identification information of the first base station to which the connection bearer of the user equipment is migrated; the first base station sends a connection reconfiguration message to the user equipment to instruct the user equipment to release a corresponding connection in the second base station and establish a corresponding connection in the first base station; and the first base station instructs the second base station to release the connection bearer of the user equipment.

9. The base station of claim 8, wherein
the management module is configured to: perform the related management of the connection of the user equipment to the second base station, comprising:
the management module adding, modifying, or deleting a connection bearer of the user equipment to the second base station.

10. The base station of claim 8, wherein
the management module is configured to: perform the related management of the connection of the user equipment to the second base station, comprising:
the management module routing data transmitted and received by the user equipment through the second base station.

11. The base station of claim 10, wherein
the management module is configured to: route the data transmitted and received by the user equipment through the second base station, comprising:
for received downlink data, the management module sending data corresponding to part or all of radio bearers received from a core network to the second base station through the dual connectivity management interface between the first base station and the second base station, and eventually sending the data to the user equipment; and for uplink data sent by the user equipment through the second base station and sent by the second base station to the first base station through the dual connectivity management interface, the management module routing the uplink data to the core network.

12. The method of claim 4, wherein
the first base station performing the related management of the connection of the user equipment to the second base station comprises:
the first base station routing data received and transmitted by the user equipment through the second base station.

13. The method of claim 1, wherein
a management of the first base station for connection bearer and context of the user equipment in the second base station is implemented through a control plane signaling process of the dual connectivity management interface between the first base station and the second base station.

14. The base station of claim 9, wherein
the management module is configured to: perform the related management of the connection of the user equipment to the second base station, comprising:
the management module routing data transmitted and received by the user equipment through the second base station.

15. The base station of claim 14, wherein
the management module is configured to: route the data transmitted and received by the user equipment through the second base station, comprising:
for received downlink data, the management module sending data corresponding to part or all of radio bearers received from a core network to the second base station through the dual connectivity management interface between the first base station and the second base station, and eventually sending the data to the user equipment; and for uplink data sent by the user equipment through the second base station and sent by the second base station to the first base station through the dual connectivity management interface, the management module routing the uplink data to the core network.

* * * * *